United States Patent
Anandan et al.

(10) Patent No.: US 12,244,450 B1
(45) Date of Patent: Mar. 4, 2025

(54) METHOD AND SYSTEM FOR NETWORK SEGMENTATION USING SAFETY INTEGRITY LEVEL (SIL)

(71) Applicant: Cisco Technology, Inc., San Jose, CA (US)

(72) Inventors: Swapna Anandan, Fremont, CA (US); Elango Ganesan, Portola Valley, CA (US); Flemming S Andreasen, Marlboro, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/461,267

(22) Filed: Sep. 5, 2023

(51) Int. Cl.
*H04L 41/06* (2022.01)
*H04L 67/12* (2022.01)

(52) U.S. Cl.
CPC .............. *H04L 41/06* (2013.01); *H04L 67/12* (2013.01)

(58) Field of Classification Search
CPC ................................. H04L 41/06; H04L 67/12
See application file for complete search history.

(56) References Cited

U.S. PATENT DOCUMENTS

| | | | |
|---|---|---|---|
| 11,921,845 B2 * | 3/2024 | Kawauchi | H04L 63/1433 |
| 2014/0137257 A1 | 5/2014 | Martinez et al. | |
| 2021/0158524 A1 * | 5/2021 | Madabhushi | G06T 7/11 |
| 2021/0194815 A1 | 6/2021 | Barton et al. | |
| 2023/0040607 A1 | 2/2023 | Henry et al. | |
| 2023/0057332 A1 | 2/2023 | Cantrell | |

FOREIGN PATENT DOCUMENTS

WO 2023039676 A1 3/2023

OTHER PUBLICATIONS

Kosmowski K.T., et al., "Integrated Functional Safety and Cybersecurity. Analysis Method for Smart Manufacturing Systems", Task Quarterly, vol. 23, No. 2, 2019, pp. 177-207.

\* cited by examiner

*Primary Examiner* — Minh Chau Nguyen
(74) *Attorney, Agent, or Firm* — Baker Botts L.L.P.

(57) ABSTRACT

Embodiments relate to a method for enhancing and prioritizing operation technology (OT) control systems in a safety instrumented system (SIS) environment by incorporating safety levels. The method includes receiving network packets associated with OT systems by network interface. From network packets, OT systems associated with safety integrity level (SIL) values are identified. In response to identifying OT control systems associated with SIL values, determining priority levels from SIL values of OT systems. The method includes identifying, among OT control systems, network packets associated with a critical OT system associated with a SIL value having a higher priority level. The critical OT system may be prioritized that comprises encoding the network packets of the critical OT system, with corresponding SIL value. The prioritized critical OT system may be prioritized based on SIL value and classified into a network group associated with a network tag to deliver traffic with higher priority.

20 Claims, 6 Drawing Sheets

| SIL | Reliablity | PFD | RRF* |
|---|---|---|---|
| 1 | 90% - 99% | 0.1 - 0.01 | 10 to 100 |
| 2 | 99% - 99.90% | 0.01 - 0.001 | 100 to 1000 |
| 3 | 99.90% - 99.99% | 0.001 - 0.0001 | 1000 to 10000 |
| 4 | >99.99% | 0.0001 - 0.00001 | 10000 to 100000 |

FIG. 3B

| Safety Integrity Level | Probability of Failure on Demand | Risk Reduction Factor |
|---|---|---|
| SIL 4 | $\geq 10^5$ to $<10^4$ | 100,000 to 10,000 |
| SIL 3 | $\geq 10^4$ to $<10^3$ | 10,000 to 1,000 |
| SIL 2 | $\geq 10^3$ to $<10^2$ | 1,000 to 100 |
| SIL 1 | $\geq 10^2$ to $<10^1$ | 100 to 10 |

FIG. 3C

METHOD AND SYSTEM FOR NETWORK SEGMENTATION USING SAFETY INTEGRITY LEVEL (SIL)

TECHNICAL FIELD

The present disclosure relates generally to plant operations with operational technology (OT) control systems associated with safety integrity level (SIL) values in a safety instrumented system (SIS) environment and more particularly, to methods, systems, and computer-readable media for prioritization of OT control systems based on SIL values.

BACKGROUND

In the SIS environment, the OT control systems may be assigned with certain SIL values. Each SIL value of each OT control system depicts a critical classification of OT control systems to ensure the safe operation of OT control systems, as defined in the standards international electrotechnical commission (IEC) 61508 and IEC 61511. In an industry-standard view, there may be four different SIL values defined for the OT control systems. For each SIL value, there may be a standard cyber security operation defined for the safe operation of the OT control system. Each OT control system may be assigned with SIL value as a certification based on the risk of failure. The higher the SIL, the greater the risk of failure. For example, the boiler temperature monitoring PLC will have a higher SIL as the failure to monitor the temperature may lead to disastrous accidents.

SIL values are measures of safety system performance in terms of probability of failure on demand (PFD) and this is correlated with a risk reduction factor (RRF). The higher the SIL, the lower the probability that a system will fail to perform properly. Consequently, the higher the SIL, the operating requirements are more stringent on the system/equipment and the environment. In such scenarios, an OT administrator or industry administrator or a plant operator may be informed or alerted or notified about criticality of OT control systems based on SIL values, for example, when a critical threshold value has higher SIL value. Based on the SIL value associated with the OT control system or an OT control device, cyber security assessments and operations may be implemented to maintain and control the safety operational state of the OT control system or OT control device. The cyber security assessments and operations may be defined only on the basis the SIL value (1, 2, 3, 4).

With a higher SIL value, for example, SIL 4, the critical OT control system may be associated with a higher risk of failure leading to disastrous accidents. The Industrial Automation and Control Systems (IACS) may be designed in accordance with the IEC-62443 zone and conduit model, which provides a blueprint for network segmentation. For example, the OT control system with SIL 1 may be operated according to cyber security defined for SIL 1, which is related to casual or coincidental violation. Likewise, the cyber security definition for an OT control system with SIL 2 may relate to an intentional violation using simple means with low resources, generic skills and low motivation. An OT control system with SIL 3 may have a cyber security definition relating to an intentional violation using sophisticated means with moderate resources, IACS specific skills and high motivation. An OT control system with SIL 4 may have a cyber security definition relating to an intentional violation using sophisticated means with extended resources, IACS-specific skills and high motivation.

However, the IACS with the zone and conduit model does not address functional safety requirements as part of the secure network design. Traditionally, OT asset owners relied on segregating the critical OT control systems from the SIS environment. However, existing technologies are relying on integrating the critical OT control systems and SIS environment to lower costs and make use of the benefits from the information exchange between the critical OT control system and SIS environment.

Further, existing techniques and methods cause the monitoring device/system to alert the OT administrator or operator about all the devices with SIL values. For example, the OT administrator may be alerted that all the four OT control systems are critical since all the OT control systems are associated with SIL values. However, one or more OT control systems may be more critical among the OT control systems with the SIL values. For example, OT control system with SIL 4 is more critical than OT control systems with SIL 1 and SIL 2 or SIL 3. Existing procedures only focus on SIL values, but do not determine which of the OT control systems may need instant attention. Additionally, existing procedures simply read the SIL values but fail to recognize the range of criticality and thus may prolong taking control actions on the corresponding critical OT control system.

BRIEF DESCRIPTION OF THE DRAWINGS

FIG. 3a, FIG. 3b and FIG. 3c illustrate safety integrity levels (SIL), probability of failure on demand (PFD) and risk reduction factor (RRF) ranges, according to an embodiment.

DETAILED DESCRIPTION

Overview

Figure 1:
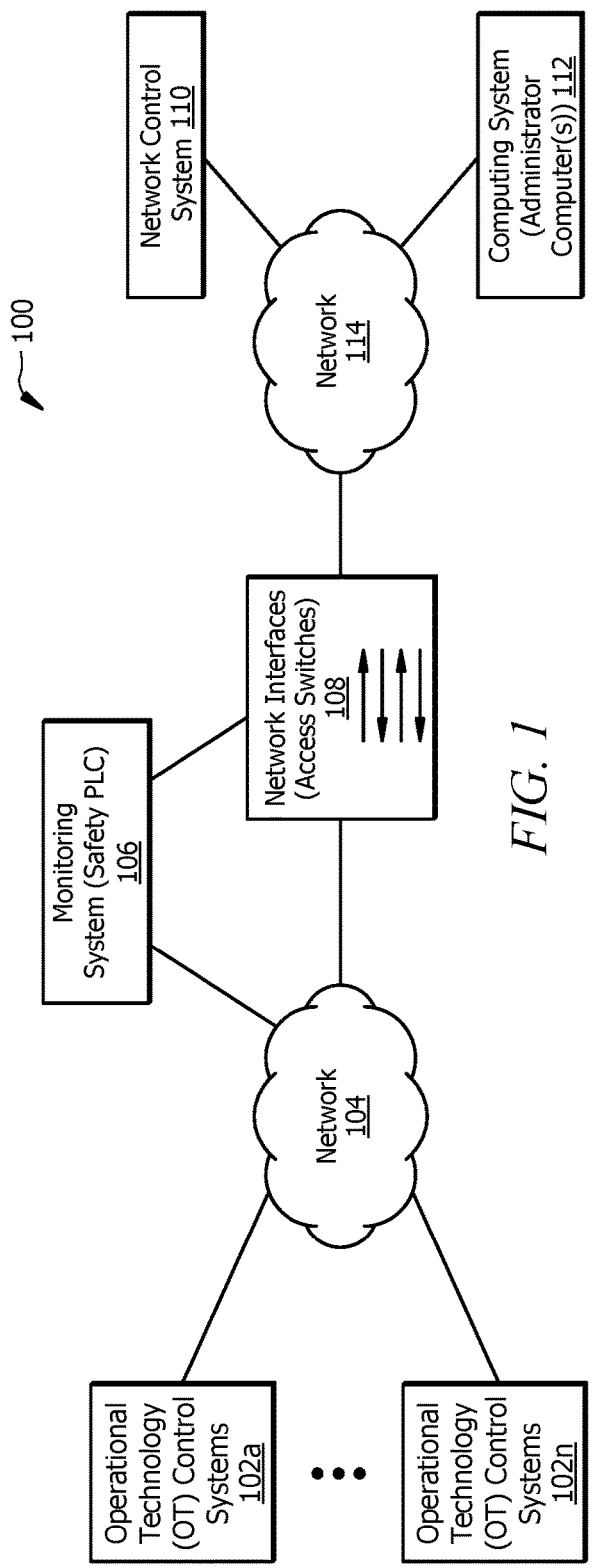
FIG. 1 illustrates a distributed network environment with a network control system, for communicating with multiple network interfaces, and operational technology (OT) control systems, according to an embodiment.

Embodiments of the present disclosure relate to a method implemented by a network control system to perform prioritization of operational technology (OT) control systems in a safety instrumented system (SIS) environment. A plurality of network packets associated with the OT control systems may be received by a network interface that is communicatively coupled to the network control system, and the OT control systems. In an embodiment, the network interface may receive network packets of the OT control systems when a monitoring device associated with the OT control systems detects a safety event. In an embodiment, the network interface may receive network packets from the OT control systems that are associated with the safety integrity level (SIL) values. From the plurality of network packets, a plurality of OT control systems that may be associated with SIL values may be identified or determined. In response to identifying the plurality of OT control systems associated with the SIL values, priority levels may be determined from the SIL values of the plurality of OT control systems. An OT control system that may be a critical OT control system may be identified and network packets associated with the critical OT control system, among the plurality of OT control systems, may be identified which may be associated with a SIL value having a higher priority level. For example, an OT control system may be determined to be the critical system when the OT control system is associated with SIL value 4. The critical OT control system may be prioritized based on the corresponding SIL value. In particular, the critical OT control system may be prioritized by encoding the network packets, associated with the critical OT control system, with the corresponding SIL value and classified into a network group associated with a network tag to perform safety operations. In an embodiment, OT control system may be identified, managed/handled and de-prioritized based on the corresponding SIL value. For example, an alert from the boiler safety system may be identified as being originated from the boiler safety system and may be prioritized to reach the monitoring systems and the safety action will have to be part of the OT safety guideline such as shut the boiler. This message has high priority and is targeted to the boiler temperature PLC and the network will ensure the message is delivered with the highest network priority.

Embodiments of the present disclosure relate to a method for prioritizing a plurality of OT control systems according to SIL values. The method includes identifying network packets associated with each of the plurality of OT control systems that may be associated with a SIL value. The method includes encoding the network packets, associated with each of the plurality of OT control systems, with at least a part of the corresponding SIL value and at least a portion of a network tag of a network group of a plurality of network segments. Existing 802.1p priority header values do not convey the proper SIL value information and hence another mechanism is needed. Since not all OT traffic is IP-based, it is important that the SIL value be conveyed at Layer 2. One option includes use of the CMD header, which may convey a network tag in the form of a security group tag (SGT). For example, name space of the SGT may be split into two parts with one part assigned to the network group (with the network tag) and the other part assigned to the SIL value. The method includes prioritizing the plurality of OT control systems based on the corresponding SIL value associated with each of the plurality of OT control systems to cause performing the safety operations of each of the plurality of OT control systems by computing systems associated with the corresponding network tags. Other forms of header extensions may be used as well, including header extensions used in overlay networks, like VXLAN. In an embodiment, OT control system may be identified, managed/handled and de-prioritized based on the corresponding SIL value. For example, an alert from the boiler safety system may be identified as being originated from the boiler safety system and may be prioritized to reach the monitoring systems and the safety action will have to be part of the OT safety guideline such as shut the boiler. This message has high priority and is targeted to the boiler temperature PLC and the network will ensure the message is delivered with the highest network priority.

Embodiments of the present disclosure relate to a system that includes an SIS environment, a network control system, one or more network interfaces communicatively coupled to the network control system and the OT control systems in the SIS environment, computing systems, one or more processors, and one or more computer-readable non-transitory storage media. The SIS environment includes the OT control systems that may be associated with safety integrity level (SIL) values. The network control system may be configured to store SIL values of the OT control systems and network tags of a plurality of network segments. In an embodiment, each network segment may be associated with a SGT. The one or more network interfaces may be configured to receive and deliver network packets associated with the OT control systems. The computing systems may be configured to perform safety operations for the OT control systems. The one or more computer-readable non-transitory storage media may be in communication with the one or more processors and comprising instructions, that when executed by the one or more processors, are configured to cause the system to perform one or more operations or steps. The operations may receive, by a network interface, a plurality of network packets associated with the OT control systems. In an embodiment, the network interface may receive network packets of the OT control systems when a monitoring device associated with the OT control systems detects a safety event. In an embodiment, the network interface may receive network packets from the OT control systems that are associated with the safety integrity level (SIL) values. The operations may identify, from the plurality of network packets, a plurality of OT control systems associated with the SIL values. In response to identifying the plurality of OT control systems associated with the SIL values, the operations may determine priority levels from the SIL values of the plurality of OT control systems. The operations may identify network packets associated with a critical OT control system, among the plurality of OT control systems, that may be associated with a SIL value having a higher priority level. For example, an OT control system may be determined to be the critical system when the OT control system is associated with SIL value 4. The operations may include prioritize the critical OT control system by encoding the network packets associated with the critical OT control system with the corresponding SIL value. In particular, the critical OT control system may be prioritized by encoding the network packets, associated with the critical OT control system, with the corresponding SIL value and classified into a network group associated with a network tag to perform safety operations. In an embodiment, OT control system may be identified, managed/handled and de-prioritized based on the corresponding SIL value. For example, an alert from the boiler safety system may be identified as being originated from the boiler safety system and may be prioritized to reach the monitoring systems and the safety action will have to be part of the OT safety guideline such as shut the boiler. This message has high priority and is targeted to the boiler temperature PLC and the network will ensure the message is delivered with the highest network priority.

Embodiments of the present disclosure relate to a system that includes an SIS environment, a network control system, one or more network interfaces communicatively coupled to the network control system and the OT control systems in the SIS environment, computing systems, one or more processors, and one or more computer-readable non-transitory storage media. The SIS environment includes the OT control systems that may be associated with safety integrity level (SIL) values. The network control system may be configured to store SIL values of the OT control systems and network tags of a plurality of network segments. In an embodiment, each network segment may be associated with a SGT. The one or more network interfaces may be configured to receive and deliver network packets associated with the OT control systems. The computing systems may be configured to perform safety operations for the OT control systems. The one or more computer-readable non-transitory storage media may be in communication with the one or more processors and comprising instructions, that when executed by the one or more processors, are configured to cause the system to perform one or more operations or steps. The operations may include identifying network packets associated with each of the plurality of OT control systems associated with a SIL value. The operations may include encoding the network packets, associated with each of the plurality of OT control systems, with at least a part of the corresponding SIL value and at least a portion of a network tag of a network group of a plurality of network segments. The network tag includes a security group tag (SGT). For example, name space of the SGT may be split into two parts with one part assigned to the network group (with the network tag) and the other part assigned to the SIL value. The operations may include prioritizing the plurality of OT control systems based on the corresponding SIL value associated with each of the plurality of OT control systems to cause performing the safety operations of each of the plurality of OT control systems by computing systems associated with the corresponding network tags. The operations may include identified, managed/handled and de-prioritized the OT control systems based on the corresponding SIL value. For example, an alert from the boiler safety system may be identified as being originated from the boiler safety system and may be prioritized to reach the monitoring systems and the safety action will have to be part of the OT safety guideline such as shut the boiler. This message has high priority and is targeted to the boiler temperature PLC and the network will ensure the message is delivered with the highest network priority.

Embodiments of the present disclosure relate to one or more computer-readable non-transitory storage media including instructions that, when executed by one or more processors of a computer system comprising OT control systems associated with SIL values in an SIS environment operatively coupled to a network control system and one or more network interfaces, are configured to cause the one or more processors to perform one or more operations or steps or functions. The processors may be configured to receive, by a network interface, a plurality of network packets associated with the OT control systems. In an embodiment, the network interface may receive network packets of the OT control systems when a monitoring device associated with the OT control systems detects a safety event. In an embodiment, the network interface may receive network packets from the OT control systems that are associated with the safety integrity level (SIL) values. The processors may be configured to identify, from the plurality of network packets, a plurality of OT control systems associated with the SIL values. In response to identifying the plurality of OT control systems associated with the SIL values, the operations may determine priority levels from the SIL values of the plurality of OT control systems. The processors may identify network packets associated with a critical OT control system, among the plurality of OT control systems, that may be associated with a SIL value having a higher priority level. For example, an OT control system may be determined to be the critical system when the OT control system is associated with SIL value 4. The processors may include prioritize the critical OT control system by encoding the network packets associated with the critical OT control system with the corresponding SIL value. In particular, the critical OT control system may be prioritized by encoding the network packets, associated with the critical OT control system, with the corresponding SIL value and classified into a network group associated with a network tag to perform safety operations. For example, an alert from the boiler safety system may be identified as being originated from the boiler safety system and may be prioritized to reach the monitoring systems and the safety action will have to be part of the OT safety guideline such as shut the boiler. This message has high priority and is targeted to the boiler temperature PLC and the network will ensure the message is delivered with the highest network priority.

Embodiments of the present disclosure relate to one or more computer-readable non-transitory storage media including instructions that, when executed by one or more processors of a computer system comprising OT control systems associated with SIL values in a SIS environment operatively coupled to a network control system and one or more network interfaces, are configured to cause the one or more processors to perform one or more operations or steps or functions. The processors may be configured to identify network packets associated with each of the plurality of OT control systems associated with a SIL value. The processors may encode the network packets, associated with each of the plurality of OT control systems, with at least a part of the corresponding SIL value and at least a portion of a network tag of a network group of a plurality of network segments. The network tag includes a security group tag (SGT). For example, name space of the SGT may be split into two parts with one part assigned to the network group (with the network tag) and the other part assigned to the SIL value. The processors may include prioritizing the plurality of OT control systems based on the corresponding SIL value associated with each of the plurality of OT control systems to cause performing the safety operations of each of the plurality of OT control systems by computing systems associated with the corresponding network tags. In an embodiment, OT control system may be identified, managed/handled and de-prioritized based on the corresponding SIL value. For example, an alert from the boiler safety system may be identified as being originated from the boiler safety system and may be prioritized to reach the monitoring systems and the safety action will have to be part of the OT safety guideline such as shut the boiler. This message has high priority and is targeted to the boiler temperature PLC and the network will ensure the message is delivered with the highest network priority.

The embodiments recognize the existing challenges in controlling and managing the critical OT control systems within the SIS environment. Also, the embodiments recognize the existing challenges to control and manage based on ranges of PFD and RRF values associated with the OT control systems as existing techniques may alert the OT administrators about all the OT control systems that may be involved in safety events and that may prolong taking control actions or safety measures on the corresponding critical OT control system.

To solve the existing challenges, the embodiments of the present disclosure provide a solution for identifying and prioritizing any kind of traffic associated with the critical OT device/OT system based on SIL levels or SIL values when the OT device/OT system is malfunctioning. In particular, critical OT device/OT system identification and prioritization may be based on encoding SIL within ethernet frame tags, and/or within network packets. The encoding of SIL with the network packets may ensure prioritized control actions taken and delivered for safety requirements, for example, safety communication, emergency shutdown or interlock of OT devices/systems. One of the technical advantages of the present disclosure of using SIL information to ensure priority and safety criticality of network packets to and/or from the OT control systems associated with SIL values The present disclosure provides a technical advantage of having the SIL information in the network traffic of the critical OT control systems/devices which allows the OT administrator to ensure additional safety measures for the OT assets based on the SIL levels. The SIL information in the ethernet packet can be used for risk alerts in a parallel redundancy protocol (PRP) networks described in the IEC 62439-3 standard for performing safety measures, safety communication and safety criticality of OT systems. If high SIL encoded asset packets are observed without PRP then the high SIL can be detected with a high score. The present disclosure provides an advantage of using SIL levels for implementing enhanced safety communication, and the SIL levels may be used by the network to ensure prioritization of traffic to and from high SIL OT assets. The present disclosure provides a technical advantage by avoiding the need to build a parallel safety monitoring control network to monitor the process control network.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Embodiments of the present disclosure provide prioritization of OT control systems in the SIS environment by encoding OT safety integrity level (SIL) information within ethernet frame tags that may be further utilized for classification of OT control systems to network groups for performing prioritized safety operations. Embodiments provide a method and a system where safety instrumented systems may use the network infrastructure. Embodiments of the present disclosure provide a network controller to signal the SIL information for a given OT device to an access switch, router, or access point and a method by which the SIL information may be signaled together with grouping information relating to network segmentation using security group tags (SGTs). Embodiments of the present disclosure provide a method for satisfying the SIL levels or SIL values or SIL information by leveraging various scheduling, throttling, redundancy and interface selection techniques for network packets received. The present disclosure provides additional functionality defining the utilization of the SIL values by underlying network infrastructure to provide the corresponding risk reduction factor (RRF). For example, a pressurized tank in the SIS environment may include a safety instrumented function (SIF) in the form of a pressure relief system with different SIL levels.

Embodiments of the present disclosure utilize a network controller, for example, a Cisco® Identity Service Engine (ISE), monitoring system, for example, safety programmable logic controller (PLC), and various IoT devices, OT systems, OT assets or any component capable of implementing and executing safety instrumented function (SIF) in process control environment and/or SIS environment. In an embodiment, a plurality of OT systems/devices may be assigned with certain SIL values/SIL information. In existing scenarios, the OT systems/devices may not be aware of or understand their SIL value and thus cannot signal the SIL value/SIL information to monitoring devices/systems and access points. Also, existing techniques do not provide a way for the OT systems/devices to signal the SIL value/SIL information in network packets via utilizing the network controller and network switches that determines the prioritization of the OT systems based on the SIL value/SIL information.

In an embodiment, one or more OT systems/devices, after their installation and configuration in the process control environment, may be assigned SIL value/SIL information from an industry point of view and each SIL value/SIL information of each OT system/device may be stored in a directory or memory of the network control system. The network control system stores OT system/device characteristics, OT system/device type information, SIL values/SIL information of each OT system/device, capability and operational standards and limits of each OT system/device, and the like. For example, the embodiments configure the network controller (ISE) to store the SIL level for a particular device. Also, the network controller may be provisioned with SIL values/SIL information for the different OT systems/devices in the network of OT systems/devices. In an embodiment, when an OT system/device connects or is activated upon occurrence of a safety event for the OT system/device, the network controller (ISE) may provide the SIL value/SIL information to the access point/access switch. In an embodiment, the network controller may detect the OT control systems with SIL value or SIL information, that have reached a threshold value. In some embodiments, the SIL value/SIL information may be provisioned based on a particular access switch port or a network segment, for example, the network segment corresponding to an IEC62443 cell or zone. In some embodiments, automated OT system/device profiling, for example, as provided by Cisco® Cyber Vision, may also be helpful in providing the SIL value/SIL information to the access point/access switch.

To solve the existing problem relating to signaling the SIL value/SIL information in the network packets, the traffic for OT system/device may be marked with a certain priority level (for example, high priority level) with corresponding SIL value/SIL information. For example, when the access point/access switch learns about the SIL value/SIL information associated with a particular OT system/device or port, the access point/access switch marks the traffic of that particular OT system/device with the corresponding SIL value/SIL information. Additionally, the SIL value/SIL information may be encoded into the ethernet frames, which may be used for prioritization of network traffic from SISes that may enable enhanced safety communications, and safety measures to prevent or mitigate hazardous events. The OT systems/devices may be classified into different network segments by assigning network tags (security group tags (SGTs)) and hence creating zones with assets based on similar characteristics, for example, cyber measures and tools for safety operations. In some embodiments, two or more OT systems/devices may be present within the same zone which require a differentiated treatment based on the SIL value/SIL information. To recognize and prioritize in the zone, the SIL value/SIL information may be determined from the upper two bits of the SGT, for example, the upper two bits of SGT of the network segment may be used to convey the SIL value/SIL information. The network controller such as ISE, which may be a policy definition engine, may assign the bits for SIL value along with zone identification (ID) which may use the lower bits. In an exemplary embodiment, for the OT system with SIL 4, the two bits of the SGT namespace may be mapped to SIL 4, which may be considered as the highest desired safety level. Similarly, the two bits of the SGT namespace may be mapped to SIL 1-4 for any OT system. As an example, consider a pressurized tank T3 which includes a SIF in the form of a safety release valve with an associated pressure sensor and logic controller all operating at SIL level 3. Another, less dangerous pressurized tank T2 may include a similar SIF operating at SIL level 2. Similarly, a tank T1 with SIL level 1. Each of these tanks includes a different SIL level based on their safety risk, and network communication associated with the SIF for each needs to take that into account. When a safety event occurs, a safety operation corresponding to the SIL value for that device needs to be implemented by the underlying network infrastructure. Referring to FIG. 3b and FIG. 3c, the SIL values provide an indication of RRF required for a given SIL. In an embodiment, SIL value may be utilized to determine and control the network packets and network communication of the OT system upon reaching the safety event. A SIL value of 1 (SIL 1) implies an RRF between 10 and 100. Thus, if a packet is received with a SIL value of 1, the network controller (ISE) defines the likelihood of that packet being lost or corrupted to be somewhere between 10 and 100 times smaller than if the packet did not include any SIL value. Similarly, a SIL value of 2 implies a drop or corruption likelihood between 100 and 1,000 times smaller, whereas a SIL value of 3 requires between 1,000 and 10,000 times smaller, and a SIL value 4 requires between 10,000 and 100,000 times smaller. When the router or access switch processes and forwards the packet, the access switch utilizes the SIL value by including it in the packets that adhere to the corresponding RRFs. During normal SGT operation, the SIL level provided in the SGT may be preserved as the packet is sent through different switches and routers. One or more ways in which the access switch may process the packets include, but are not limited to, priority queuing and drop precedence of the network packets, traffic throttling on interfaces, interface selection when multiple forwarding paths exist (use less congested and/or technology least likely to corrupt or drop the packet), determine forward error correction, packet duplication over a single or multiple interfaces. The access switch may determine, calculate and maintain RRF scores for each of the one or more ways, determine how many of the one or more ways may be useful, and apply the one or more ways for a given packet. In some embodiments, different encoding techniques may be utilized to convey SIL values of the OT control systems with or within the network packets. For example, the SIL value may be encoded within the SGT (Ethernet CMD header, VXLAN-GPO (Group Policy Option), or some other header extension, for example, 802.1ad or Q-in-Q, which is used to insert VLAN tags into existing 802.1q tagged frames for VLAN stacking, can be used to insert SIL information.

The present disclosure may be related to building and utilizing an enhanced OT risk analysis model using fault tree analysis based on one or more attack-free analyses. In exemplary embodiments, the one or more attack-free analyses may include, but are not limited to, safety attack fault tree analysis, and cyber-attack tree analysis. In an embodiment, the safety attack fault tree analysis may be based on the SIL assigned to the OT asset in the SIS environment and/or process control environment. The cyber-attack tree analysis may be implemented on communication channels and the underlying network devices service the IEC 62443 conduit where each device/node represents the single step towards the attack towards a target OT asset. Based on the OT risk analysis model, the vulnerability of the communication channel served by the router and switches may be determined and steps may be taken to safeguard the attack fault path. In an embodiment, the present disclosure provides safety goals as input to derive functional safety requirements for the OT network. From the SIL value and SGT tags, assurance tags may be derived that can be used for the OT network as a risk assessment policy. In the IEC62443 zone and conduit model, the conduit policy may be implemented in the network layer and the SIL information may be used for traffic prioritization for critical OT control systems.

FIG. 1 illustrates a distributed network environment 100 with a network control system 110, for example, a network controller 110, communicating with one or more operational technology (OT) control systems 102a-102n, one or more monitoring system 106, one or more network interface 108, the network control system 110 and computing systems 112, according to an embodiment.

FIG. 1 illustrates the distributed network environment 100 with which one embodiment can be implemented and comprises components/elements that are implemented at least partially by hardware at one or more computing devices, such as one or more hardware processors executing stored program instructions stored in one or more memory units for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

In an embodiment, the distributed network environment 100 may be a multi-tenant environment and may refer to industrial plant environments, for example, a chemical plant environment and a petroleum plant environment. The distributed network environment 100 may refer to any safety instrumented system (SIS) environment capable of including, operating, controlling and managing industrial systems, industrial devices, plant systems, plant devices, for example, SIS-associated devices, SIS-associated systems, OT control systems/devices, process control systems, field devices/systems and the systems related industrial automation and control systems (IACS) networks that may be configured to implement and execute safety instrumented function (SIF). In an embodiment, the SIS may be utilized to safeguard the process control systems to prevent a dangerous event, such as a release of toxic, flammable, or explosive chemicals. For example, the SIS is a distinct, reliable system used to complement the process control systems and take action to bring the process control systems to a normal operating state. The SIS utilizes sensors, logic solvers, and actuators to implement a SIF to reach or maintain normal operations of the process control systems. The process control systems such as those used in chemical, petroleum, and other processes, typically include one or more controllers communicatively coupled to at least one OT control system or OT control device, one or more field devices, monitoring system 106, one or more network interfaces or access switches 108, the network control system 110, and computing systems 112 via analog, digital, or combined analog/digital bus(es). In an embodiment, the one or more field devices, which may include, for example, control valves, valve positioners, switches, and transmitters (e.g., temperature, pressure and flow rate sensors), perform functions within the process such as opening or closing valves and measuring process parameters. In an embodiment, the measured process parameters from the field devices may be transmitted to the network control system 110 along with device information, device characteristics details and SIL values causing the implementation of control routines at the network control system 110 to encode the SIL values and assign network tags in the network packets of the field devices, which may be sent over the bus to the computing systems of a particular network segment/zone to control the operation of the field devices. In some embodiments, the distributed network environment 100 may include a plurality of network segments, network zones, sections, regions, areas. Each segment and zone may be configured and installed with the one or more network interface 108, for example, access switches or access points, industrial systems, industrial devices, plant systems, plant devices, for example, SIS-associated devices, SIS-associated systems, OT control systems/devices 102a-102n, process control systems, field devices/systems and the systems related IACS networks that may be configured to implement and execute safety instrumented function (SIF), administrator computers, and monitoring system 106. In an embodiment, the distributed network environment 100 and/or one or more network segments and zones may be installed with network control system 110 to maintain and control network packets or network traffic of the OT control systems/devices 102a-102n based on SIL values/SIL information. In an embodiment, the distributed network environment 100 may be configured or installed with one or more network control system 110 to learn, maintain and control network packets or network traffic of each OT control system/device 102a-102n. In an embodiment, the distributed network environment 100 may include n number of industrial systems, industrial devices, plant systems, plant devices, for example, SIS-associated devices, SIS-associated systems, OT control systems/devices 102a-102n, process control systems, field devices/systems and the systems related to IACS networks, the monitoring system(s) 106, the network interface 108, network control system 110 and the computing systems 112 depending upon the processing capacity of central processing units (CPUs) or other hardware resources of each network segment, zone, sub-zones, sub-network segment and the like. The designation n in reference characters means that in embodiments, the actual number of elements corresponding to a reference character has no specific limit other than the processing capability of related elements.

The distributed network environment 100 comprises one or more data communication networks 104 and 114, enabling network packets exchange and communications between components of the distributed network environment 100. Examples of the data communication network 104 include, without limitation, an ad hoc network, an intranet, an extranet, a virtual private network (VPN), a local area network (LAN), a wireless local area network (WLAN), a wide area network (WAN), a wireless wide area network (WWAN), a metropolitan area network (MAN), a portion of the Internet, a portion of the Public Switched Telephone Network (PSTN), near-field communication (NFC) network, a cellular technology-based network, a satellite communications technology-based network, Bluetooth, a cellular telephone network, or a combination of two or more of these networks. In an embodiment, the one or more data communication networks 104 may include any suitable links. For example, the links may include but are not limited to, one or more wireline (for example. Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET), satellite links or Synchronous Digital Hierarchy (SDH)) links. Links need not necessarily be the same throughout the environment 100. One or more links may differ in one or more aspects from one or more other links. The OT control systems 102a 102n, the monitoring system 106, network interface 108, network control system 110, the computing systems 112 and other components of the distributed network environment 100 may host or include interfaces that are compatible with one or more networks 104 and 114 and are programmed or configured to use standardized protocols for communication across the networks such as application programming interface (API) calls, transmission control protocol (TCP)/internet protocol (IP), Bluetooth, and higher-layer protocols such as hypertext transfer protocol (HTTP), transport layer security (TLS), and the like.

In an embodiment, the OT control systems 102a-102n may include control systems, control devices and other systems that encompass a broad range of programmable systems or devices that interact with the distributed network environment 100 and physical environments (or manage devices that interact with the physical environment). The OT control systems 102a-102n may include technologies to detect or cause a direct change through the monitoring and/or control of devices, processes, and events. Examples include industrial control systems, laboratory systems, petroleum environment systems, chemical environment systems, building automation systems, transportation systems, physical access control systems, process control systems, field devices/systems, the systems related to IACS networks physical environment monitoring systems, and physical environment measurement systems and other systems or devices that may be utilized in various sectors. The sectors may include oil and gas sectors, power and utility sectors, chemicals manufacturing sectors, water treatment sectors, waste management sectors, transportation sectors, scientific experimentation sectors, critical manufacturing sectors, building management and automation sectors, building lighting controls and automation sectors and mining and mineral processing sectors. For example, the OT control systems/devices 102a-102n may include pressurized tanks and boilers. In an embodiment, the OT control systems/device 102a-102n may refer to the systems/devices that may be enabled with SIF measures and relief systems. In an embodiment, the OT control systems 102a-102n may be associated with SIL values/SIL information including sub-components, sub-units, sub-systems, and sub-elements of the OT control systems 102a-102n that may include their own SIL values/SIL information defined by industry operators, zone managers, sector administrators, technicians, plant personnel, line operators, maintenance personnel, plant engineers either manually or computer commands. In an embodiment, each of the OT control systems 102a-102n may be associated with SIL values/SIL information along with ranges or scores of the probability of failure on demand (PFD) and risk reduction factor (RFD). In an embodiment, each of the OT control systems 102a-102n may be receiving network packets and/or generating its own network packets during normal operations and upon reaching a safety threshold value due to the occurrence of the safety event. The safety threshold value triggers the detection of SIL value associated with the OT control system. In an embodiment, the network packets transmitted to and from each of the OT control systems 102a-102n that may be affected by the cause of the safety event may be detected by the monitoring system 106, the network interface 108, the network control system 110 and the computing systems 112. In some embodiments, each of the OT control systems 102a-102n may comprise ethernet connection with the network interface (switches/routers) 108 and the network control system 110 to provide packet flow via the network interface 108. The ethernet connection provides the SIL value to be provided to the network interface 108 to ensure prioritization of the network traffic based on the SIL value.

In an embodiment, the monitoring system 106 may be configured to detect, manage, control and monitor normal operations of the OT control systems 102a-102n, the occurrence of any kind of safety event, detect and determine the points, units, components and systems causing the malfunctioning of the OT control systems 102a-102n in the distributed network environment 100 including the physical environment, zone, segments, areas and sectors. For example, the monitoring system 106 may include geo-fences, optical safety scanners, or other such safety monitoring devices, monitoring tools, control routines, control procedures such as a subroutine, parts of a subroutine such as lines of code using ladder logic, sequential function charts, control routine diagrams, object-oriented programming, or any other software programming language or design paradigm. The control routines described herein may be hard-coded into, for example, one or more read-only memory (ROM), mask-programmed ROM, programmable ROM (PROM), erasable PROM (EPROM), electrically erasable PROM (EEPROM), electrically alterable ROM (EAROM), application specific integrated circuits (ASICs), safety programmable logical controllers (PLCs), or any other hardware or firmware elements. The control routines may be designed using any design tools, including graphical design tools or any other type of software/hardware/firmware programming or design tools. In an embodiment, the monitoring system 106 may refer to, for example, sensors, valves, transmitters, positioners, etc., and may conform to any desired open, proprietary, or other wired and/or wireless communication or programming protocol and any appropriate communication protocol. In an embodiment, the monitoring system 106 may communicate with the OT control systems 102a-102n, the network interface 108, the network control system 110 and the computing systems 112 wirelessly and through wired connections. In some embodiments the monitoring system 106 may communicate with the OT control systems 102a-102n, the network interface 108, the network control system 110 and the computing systems 112 wirelessly and through wired connections via an application programming interface (API) calls or other communication channels enabled by communication and network interfaces of the monitoring system(s) 106. For example, the monitoring system 106 may receive an indication from the OT control system 102a, for example, a boiler that has reached a particular threshold value via the wireless channel. As another example, the monitoring system 106 may detect an indication of a disastrous safety event that has occurred compromising and threatening the physical environment of the industry zone due to the threshold value reached by the OT control system 102a, for example, a pressurized tank that has reached a particular threshold value via the wired channel. In an embodiment, the monitoring system(s) 106 may be configured to receive and/or detect network packets associated with each of the OT control systems 102a-102n. In an embodiment, the monitoring system(s) 106 may be configured to receive and/or determine and/or detect the threshold value of each OT control system 102a-102n along with PFD and RRF values.

In an embodiment, the network interface 108 may refer to access switches, access points, routers, wireless fidelity (WIFI) interface, a local area network (LAN) interface, a wide area network (WAN) interface, or a modem. In an embodiment, the network interface 108 may be configured to receive and/or detect network packets associated with each of the OT control systems 102a-102n. In an embodiment, the network interface 108 may be configured to receive and/or determine and/or detect the SIL value of each OT control system 102a-102n along with PFD and RRF values. In an embodiment, the network interface 108 may be configured to receive a plurality of information from the network control system 110. For example, the plurality of information may include, but are not limited to, OT control system information, OT control system characteristics information and device-related details, a type of event/malfunctions associated with the operations the OT control systems 102a-102n that are reaching certain threshold point, the SIL value, PFD and RRF scores from the network control system 110. In an embodiment, the information may also be provisioned based on a particular network interface 108 or access switch port or a network segment, for example, corresponding to an IEC-62443 cell or zone. In an embodiment, the network interface 108 may be configured to maintain the RRF scores of each OT control system 102a-102n associated with a SIL value.

In some embodiments, the automated OT control systems 102a-102n/device profiling may also provide the plurality of information to the network interface 108. In an embodiment, the network interface 108 may be configured to detect and prioritize the network packets based on the SIL value of each of the OT control systems 102a-102n and to cause performing safety measures/operations by the computing systems 112 of the administrators. For example, the network interface 108 learns about the SIL value associated with each OT control system 102a-102n, a particular device or particular port and marks all network traffic for that OT control system 102a-102n with the corresponding SIL value. In an embodiment, the network interface 108 may encode the SIL value and SGT in the network packets or network traffic associated with the OT control systems 102a-102n based on the corresponding SIL value detection. In an embodiment, the SIL value may be encoded in the SGT bits and as per normal SGT operation, the SIL value provided in the SGT bits may be preserved as the network packet to forward through different network interface 108, for example, different switches and routers. For example, the OT control system 102a-102n may be associated with SIL 4 and thus considered as a critical OT control system with a higher priority level of SIL value. The network packets and/or ethernet frames of the critical OT control systems 102a-102n may be encoded with SIL value and SGT tags/zone ID as classifiers to classify the critical OT control system 102a-102n for being assigned to a particular network segment and to prioritize the network traffic of that critical OT control system 102a-102n from the SIS point of view. Such encoding of the network traffic and network frames may prompt emergency by particular computing systems 112, corresponding to the SGT-based network segment, to mitigate safety events. In an embodiment, any OT control system 102a-102n may be considered as a critical OT control system based on any priority level of any SIL value associated with the OT control systems 102a-102n. For example, the OT control system 102a-102n with SIL 3 or SIL 2 or SIL 1 may become a critical control system for which the network packets/frames are encoded with corresponding part of the SIL value and portion of SGT tags/zone ID to prioritize the critical OT control system 102a-102n for safety operations. In an embodiment, the network interface 108 may receive or determine the type of safety operations for the critical OT control system 102a-102n from the network control system 110. In an embodiment, the network interface 108 may be configured to process, analyze and forward the network packets encoded with the corresponding SIL value to the computing systems 112 of a particular network segment based on the zone ID/SGT tags depending on one or more ways. The one or more ways include, but are not limited to, prioritizing queuing of the network packets of the OT control systems 102a-102n associated with any SIL value, calculating priorities for dropping the network packets to the computing systems 112 to perform the safety operations, determining traffic throttling on interface, selecting interface among multiple network interfaces of various network segments for forwarding the network packets, determining forward error correction, duplicating the network packets on one or more interface 108, and evaluating RRF scores for each of the OT control systems 102a-102n to determine the number of interface 108 needed to receive and drop the network packets to perform the safety operations by the computing systems 112. In an embodiment, the network interface 108 may provide risk alerts in a parallel redundancy protocol (PRP) networks to prioritize the network traffic to and from the OT control systems 102a-102n associated with SIL value, for example, the higher priority level of SIL value or high SIL OT control system 102a-102n.

In an embodiment, the computing systems 112 may include, but are not limited to, a desktop computer, computer system, computing system, laptop computer, tablet computer, mobile computing device, smartphone, personal computers, personal digital assistants (PDAs), laptops, or workstations, notebook, netbook, tablet computer, e-book reader, GPS device, camera, personal digital assistant (PDA), handheld electronic device, cellular telephone, smartphone, augmented/virtual reality (AR/VR) device, mixed reality (MR) device, other suitable electronic devices, or any suitable combination thereof. The computing systems 112 may be associated with one or more operators, which may include, but are not limited to, industry operators, zone managers, sector administrators, technicians, plant personnel, line operators, maintenance personnel, plant engineers either manually or computer commands. In an embodiment, different operators may be administrating different OT control systems 102a-102n in different network segments. In an embodiment, the computing systems 112 may be configured to receive prioritized network packets of prioritized OT control systems 102a-102n based on encoding the SIL values. The computing systems 112 may be configured to determine the kind of safety event that occurred in the physical environment, type of OT control systems 102a-102n and perform safety operations such as determining and delivering safety requirements, safety critical communications, emergency shutdown based on determining safety criticality of network packets to and from the plurality of OT control systems; and performing interlock of the plurality of OT control systems 102a-102n. For example, the computing systems 112 of a particular network segment as determined from the SGT tag/zone ID may complete emergency shutdown or interlock of OT control system with SIL 4.

In an embodiment, the network control system 110 may be a network controller that may comprise a set of executable program instructions or units of instructions such as executables, binaries, packages, functions, methods, or objects. In an embodiment, the network control system 110 may be hard-wired to perform the techniques or may include functions of digital electronic devices such as at least one ASIC or field programmable gate array (FPGA) that is persistently programmed to perform the techniques or may include at least one general purpose hardware processor programmed to perform the techniques pursuant to program instructions in firmware, memory, other storage, or a combination. Such devices may also combine custom hard-wired logic, ASICs, or FPGAs with custom programming to accomplish the described techniques. In some embodiments, the network control system 110 may be a web server including or comprising an HTTP server that can encode SIL values with or within SGT tags, prioritize the OT control systems 102a-102n based on SIL values, determine the kind of safety operations required to mitigate safety criticality associated with the OT control systems 102a-102n, transmit responses including HTML payloads with dynamically generated web pages, and may include a firewall, load balancer, or other infrastructure to prioritize a large number of network packets associated with the critical OT control systems 102a-102n and any OT control system 102a-102n based on the SIL value.

Figure 2:
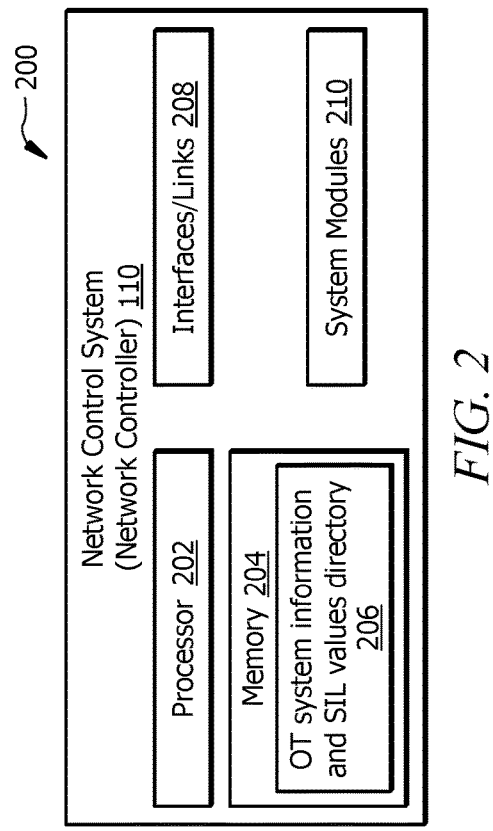
FIG. 2 illustrates components and modules of a network control system for OT control systems prioritization, according to an embodiment.

FIG. 2 illustrates components and modules of the network control system 110 for prioritizing critical OT control systems 102a-102n, according to an embodiment.

The network control system 110 may include processor(s) 202, memory 204, interfaces 208 and system modules 210. The processor(s) 202 of the network control system 110 may be any electronic circuitry including, but not limited to, state machines, one or more CPU chips, logic units, cores (e.g., a multi-core processor). FPGAs, ASICs, or digital signal processors (DSPs). The processor 202 may be a programmable logic device, a microcontroller, a microprocessor, or any suitable combination of the preceding. The processor 202 is communicatively coupled to and in signal communication with the memory 204 and the interface 208. The processor 202 may be configured to process data and may be implemented in hardware and/or software. For example, the processor 202 may be 8-bit, 16-bit, 32-bit. 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory 204 and executes them by directing the coordinated operations of the ALU, registers and other components.

Figure 3A:
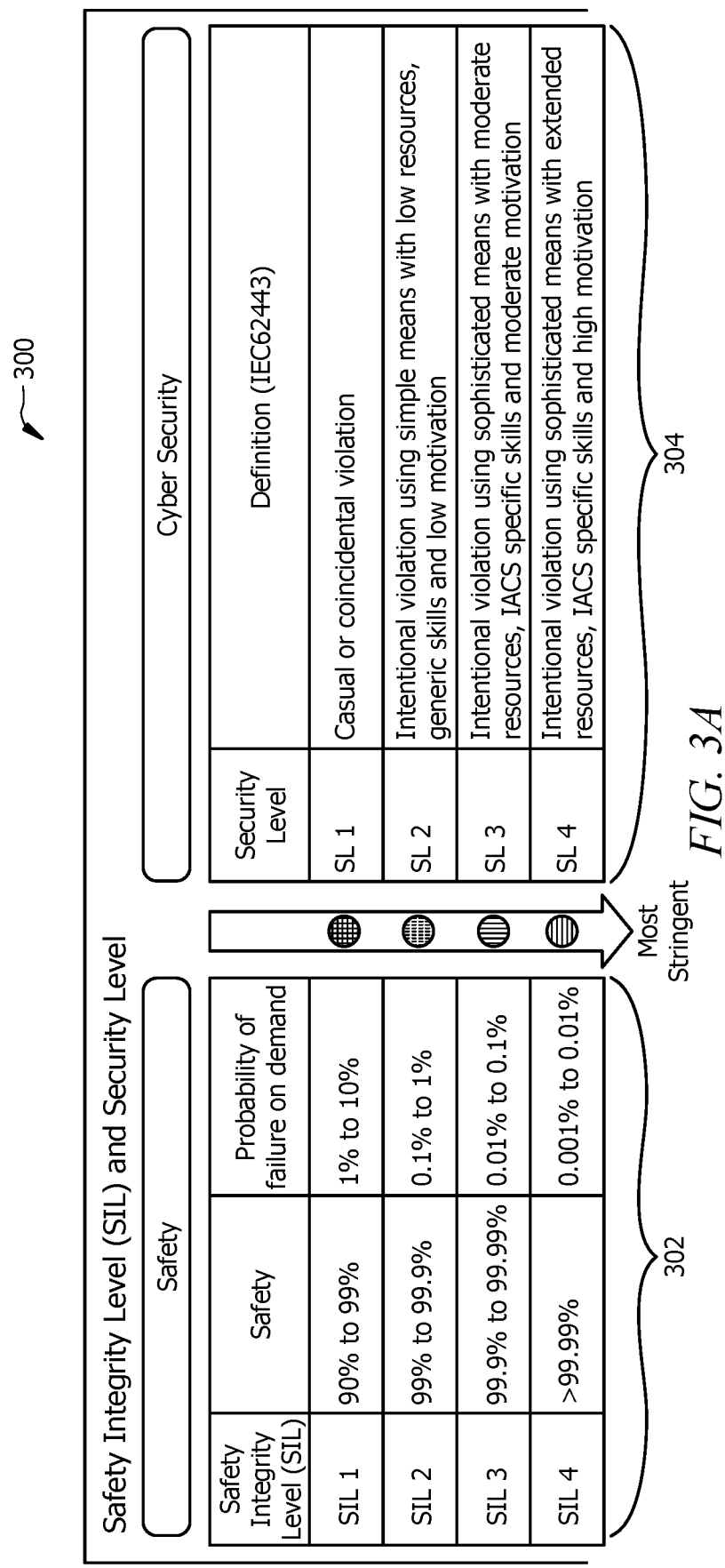

The memory 204 includes one or more disks, tape drives, or solid-state drives, and may be used as an over-flow data storage device to store programs when such programs are selected for execution and to store instructions and data that are read during program execution. The memory 204 may be volatile or non-volatile and may include ROM, random access memory (RAM), ternary content addressable memory (TCAM), dynamic random-access memory (DRAM), and static random-access memory (SRAM). The memory 204 of the network control system 110 may comprise OT system information and SIL values directory 206 that may be operable to store the OT control system information, the OT control system characteristics information and device-related details, OT system/device type information, capability and operational standards and limits of each OT system/device, SIL values of the OT control systems 102a-102n, PFD and RRF scores of the OT control systems 102a-102n. In an embodiment, one or more OT systems/devices, after their installation and configuration in the process control environment, may be assigned SIL value from the industry point of view and each SIL value/SIL information of each OT system/device may be stored in the directory 206 or memory 204 of the network control system 110. For example, FIG. 3a-FIG. 3c show industry-specified SIL values for different OT control systems along with their security operations. When an OT system/device 102a-102n connects or is activated upon reaching a threshold value, the network interface 108 may receive network packets from the OT system 102a-102n and queries the network controller (ISE) 110 to provide the corresponding SIL value to the network interface 108. The memory 204 further comprises data storage to store information of various network segments, SGT tags of each network segment, details of the computing systems 112, specifics of each operator associated with the computing systems 112 to control and initiate the safety operations and any data, instructions, logic, rules, or code operable to execute the functions to determine and prioritize the OT control systems 102a-102n based on the SIL value and classify the OT control systems into different network groups/segments based on the SGT tags. In an embodiment, the memory 204 also stores OT risk analysis model to determine risky parameters and factors causing the OT control systems 102a-102n to reach threshold value and resulting in the critical OT control systems 102a-102n. In an embodiment, the OT risk analysis model determines the safety operations be applied to the critical OT control systems 102a-102n.

The interfaces/links 208 may refer to communication links to communicate with the monitoring systems 106, the network interface 108 and the computing systems 112. The interfaces/links 208 may include, but are not limited to, wired and/or wireless communications. The interfaces/links 208 may be an electronic circuit that is configured to enable communications between devices. For example, the network interface may include one or more serial ports (e.g., USB ports or the like) and/or parallel ports (e.g., any type of multi-pin port) for facilitating this communication. As a further example, the network interface may include a WIFI interface, a LAN interface, a WAN interface, a modem, a switch, or a router. In an embodiment, the network interface may be configured to use any suitable type of communication protocol as would be appreciated by one of ordinary skill in the art.

The system modules 210 may refer to hardware modules and software modules that may be configured to implement and execute various steps for determining the network packets of the OT control systems 102a-102n, identifying the SIL value and priority level of the SIL value, prioritizing the critical OT control systems 102a-102n based on the SIL value by encoding the SIL value in the network packets to prioritize the safety operations and control actions on the prioritized OT control systems 102a-102n. In an embodiment, the prioritized and critical OT control systems 102a-102n may be classified into the network segment based on the SGT determined for the critical OT control systems 102a-102n. The SIL value may be encoded with or within the SGT frame for signaling the prioritization of the OT control systems 102a-102n. Various hardware and software modules are explained with reference to FIG. 4 and FIG. 5 herein.

Figure 4:
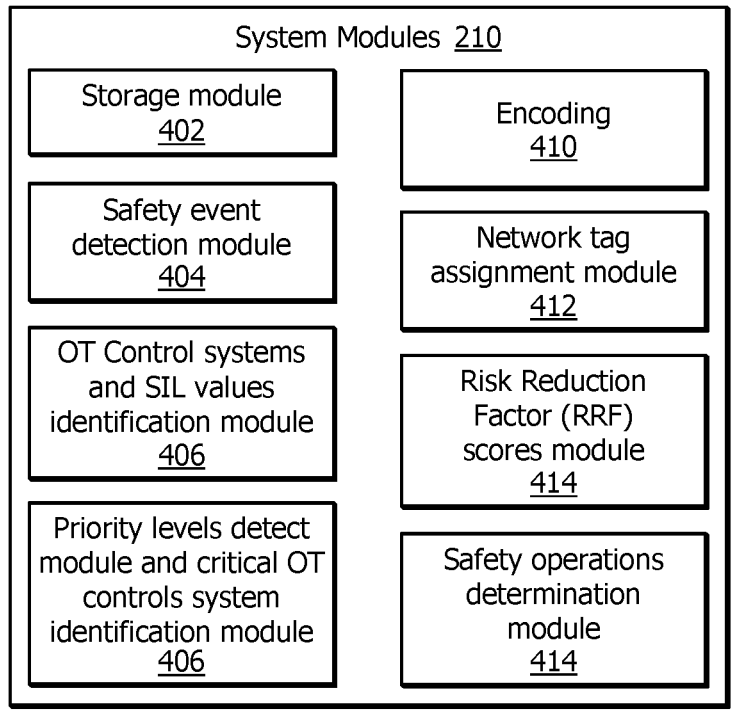
FIG. 4-FIG. 5 illustrate various modules of a network control system, according to an embodiment.

FIG. 4 illustrates various modules of network control system 110, according to an embodiment. The system modules 210 include, but are not limited to, storage module 402, safety event detection module 404, OT control systems and SIL value identification module 406, priority levels detect module and critical OT control system identification module 408, classification and encoding module 410, network tags assignment module 412, risk reduction factor (RRF) score module 414 and safety operations determination module 416.

The storage module 402 may be programmed or configured to store the plurality of information of the OT control systems 102a-102n similar to the information stored in the memory 204. For example, after OT control system profiling and configuration, the plurality of information may automatically be stored in the memory 204 with the trigger of storage module 402. When the safety event is reached by the OT control system 102a-102n, the type, characteristics, priority level of SIL value may be detected from the memory 204 and informed to the network interface 108.

The safety event detection module 404 may be programmed to detect the occurrence of the safety event associated with the OT control systems 102a-102n in the SIS environment 100. The safety event may relate to any activity that degrades or compromises the normal functioning of the OT control systems 102a-102n. In an embodiment, the OT control systems 102a-102n may provide the indication to the safety event detection module 404 of the network controller 110 that the OT control systems 102a-102n have been affected by the safety event.

The OT control systems and SIL value identification module 406 may be programmed to determine and identify a plurality of network packets associated with the OT control systems 102a-102n. In an embodiment, the OT control systems and SIL value identification module 406 may be programmed to identify a plurality of OT control systems 102a-102n that may be associated with SIL values. The plurality of OT control systems 102a-102n associated with the SIL values may be identified from the plurality of network packets corresponding to different OT control systems 102a-102n.

The priority levels detect module and critical OT control system identification module 408 may be programmed to determine priority levels of the SIL values corresponding to the plurality of OT control systems 102a-102n. For example, the module 408 determines whether the OT control system 102a is associated with SIL 4 or SIL 3 or SIL 1. Based on the determination of the priority levels, the module 408 identifies network packets associated with the OT control system 102a-102n that are considered critical based on the higher priority level of the SIL value. For example, SIL 4 may be considered a higher priority level and the systems associated with SIL 4 needs critical safety operations.

The encoding module 410 may be programmed to prioritize the critical OT control system 102a-102n by encoding the network packets associated with the critical OT control system 102a-102n with the corresponding SIL value. In an embodiment, the encoding of the SIL value prioritizes the critical OT control system 102a-102n for safety operations.

The network tags assignment module 412 may be programmed to determine the network group corresponding to the critical OT control system 102a-102n. The network tags assignment module 412 may be configured to assign a network tag that includes SGT tag to the critical OT control system 102a-102n. In an embodiment, the network tag including the SGT tag may be assigned to the network packets ethernet frames. The SIL value may be included with the network tag in the network packets to cause the computing systems 112 to detect the priority level of the OT control systems 102a-102n and perform the safety operations corresponding to the network tag.

The RRF score module 414 may be programmed to evaluate RRF scores and RRF range. In an embodiment, the RRF score module 414 may determine PFD scores or ranges associated with each of the OT control systems 102a-102n.

The safety operations determination module 416 may be programmed to determine the kind of safety operations required for particular OT control system 102a-102n. In an embodiment, the kind of safety operations may be determined based on the SIL value of the OT control system 102a-102n. The kind of safety operations may be referred from exemplary illustrated FIG. 3a-FIG. 3c. For example, the safety operations may include determining and delivering safety requirements, safety critical communications, emergency shutdown based on determining safety criticality of network packets to and from the plurality of OT control systems; and performing interlock of the plurality of OT control systems 102a-102n.

Figure 5:
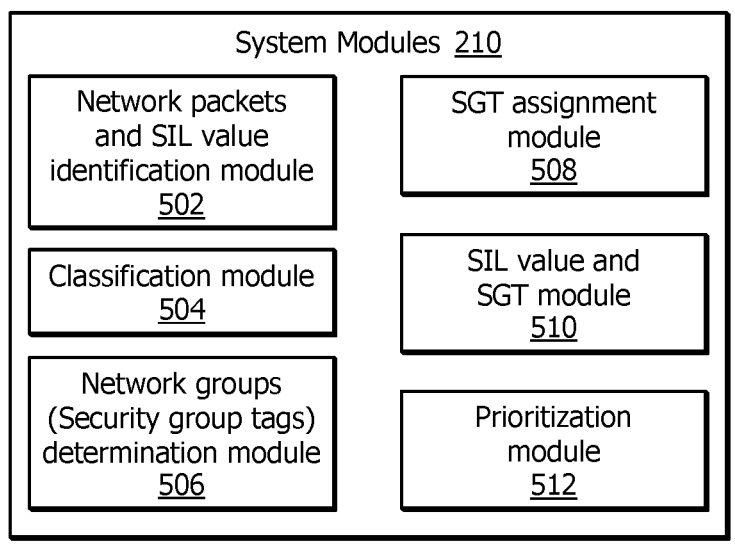

Referring to FIG. 5, the system modules 210 may further include, but are not limited to, network packets and SIL value identification module 502, classification module 504, network groups (SGT tags) determination module 506, SGT assignment module 508, SIL value and SGT module 510 and prioritization module 512.

The network packets and SIL value identification module 502 may be programmed to receive and identify the network packets associated with each of the plurality of OT control systems 102a-102n. In an embodiment, the network packets and SIL value identification module 502 identifies the plurality of OT control systems 102a-102n that are associated with the SIL value to proceed with prioritizing them based on their corresponding SIL value.

The classification module 504 may be programmed to classify the plurality of OT control systems 102a-102n into different network segments to cause managing the OT control systems 102a-102n on priority basis. The classification module classifies the plurality of OT control systems 102a-102n by encoding the network packets with the corresponding SGT tags.

The network groups (SGT tags) determination module 506 may be programmed to determine a particular network group among the plurality of network segments for the plurality of OT control systems.

The SGT assignment module 508 may be programmed to determine the appropriate network tag and type of OT control system 102a-102n to send an alert on the non-functional parameters of the affected OT control system 102a-102n. In some embodiments, the type of safety event that caused the OT control system 102a-102n to indicate the SIL value may also be determined to identify the network group and network tag for appropriate safety operations of the OT control systems 102a-102n.

The SIL value and SGT module 510 may be programmed or configured to include the corresponding SIL value with or within the network tag to the network packets or ethernet frames of respective OT control systems 102a-102n to identify the prioritization and network segment or zone of the distributed network environment to initiate safety operations on the plurality of OT control systems 102a-102n for managing safety criticality of network packets to and/from the OT control systems 102a-102n based on the priority determined from the corresponding SIL value.

The prioritization module 512 may be programmed or configured to prioritize the plurality of OT control systems 102a-102n, to cause performing the safety operations of each of the plurality of OT control systems 102a-102n by the computing systems 112 associated with the corresponding network tags, based on the priority level detected from the corresponding SIL value associated with each of the plurality of OT control systems 102a-102n.

Figure 6A:
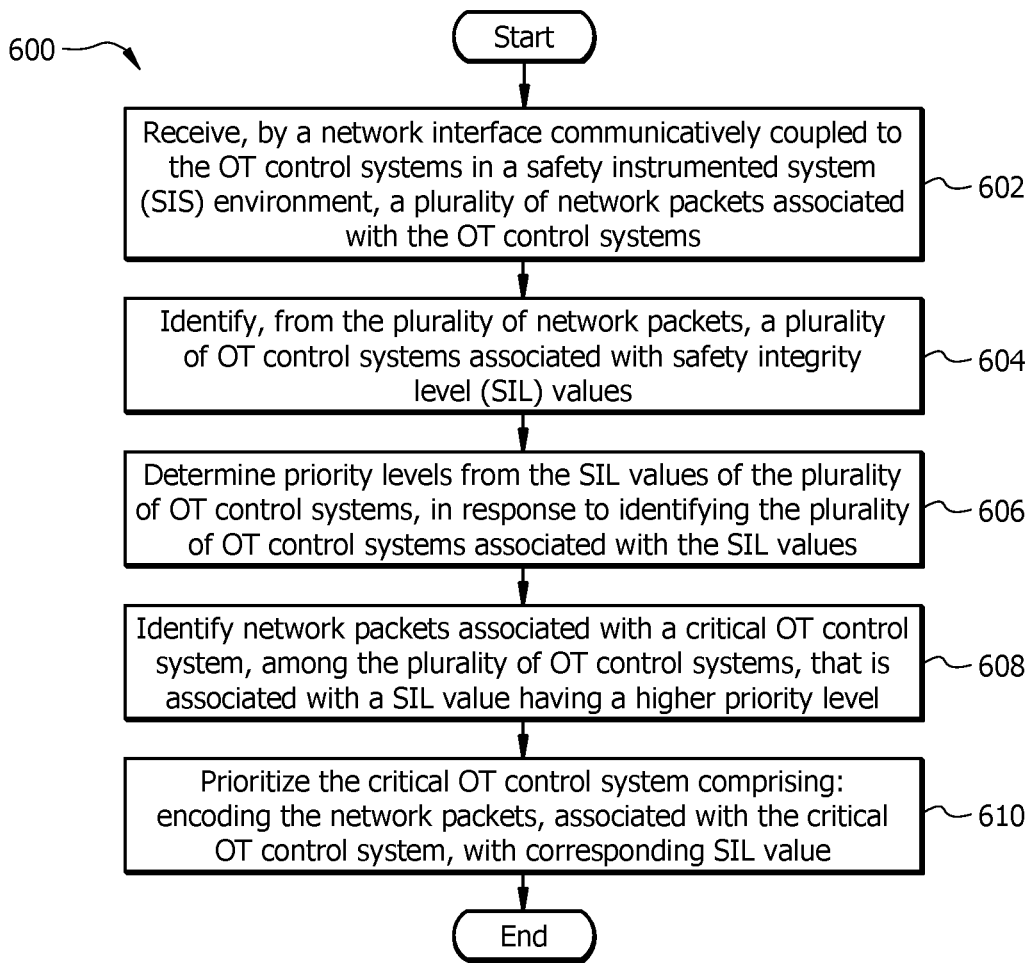
FIG. 6a depicts an example flowchart for OT control systems prioritization based on encoding SIL values of OT control systems in network packets, according to an embodiment.

FIG. 6a depicts an example flowchart for OT control systems 102a-102n prioritization based on SIL values, according to an embodiment. The process 600 utilizes an SIL value as a tag to ensure prioritized control actions or security services on the OT control systems 102a-102n for safety requirements, for example, emergency shutdown or interlock of the OT control systems. In an embodiment, the process 600 may be operable for ethernet traffic. The process 600 may detect, determine and distribute the SIL value by encoding with or within the network tags for prioritizing the OT control systems 102a-102n for their safety operations. In an embodiment, the process 600 operating in the SIS environment may use the same infrastructure as regular systems and utilize the network controller (the network control system 110) to signal the SIL value along with the grouping information, for example, SGT or network tag for a particular OT control system 102a-202n, for example, the critical OT control system to the network interface 108, for example, access switch. In an embodiment, the process 600 utilizes the SIL value by the network infrastructure to support the RRF scores implied by the SIL value by leveraging various scheduling, throttling, redundancy and interface selection techniques for the network packets processed.

Process 600 begins at step 602 to receive, by the network interface 108 communicatively coupled to the OT control systems 102a-102n, the plurality of network packets associated with the OT control systems 102a-102n. For example, pressurized tanks that include the SIF may notify the OT control systems 102a-102n that may be associated with the safety event occurred and notified to the network control system 110 through the network interface 108. In an embodiment, the network interface 108 receives millions of network packets from all the devices and OT control systems 102a-102n that may need prioritization to ensure control actions or immediate shutdowns or attention from the administrator computing systems 112 on a priority level.

At step 604, the network interface 108 may query the network control system 110 to identify the OT control systems 102a-102n that may be associated with the SIL values. In an embodiment, the network control system 110 identifies and indicates the OT control systems 102a-102n associated with the SIL values to the network interface 108 directly without needing queries from the network interface 108. For example, the pressurized tanks that include the SIF in the form of the pressure relief system with different SIL levels may be identified. In an embodiment, the network control system 110 may store SIL value for the particular OT control system 102a-102n and all the OT control systems 102a-102n. When the OT control system 102a-102n connects to the network connection, the network control system 110 provides the SIL value to the network interface 108. In an embodiment, the SIL value may also be provisioned based on a particular access switch port or a network segment. In some embodiments, automated device profiling may also be providing such SIL value. In an embodiment, each OT control system 102a-102n may be authenticated to identify the network packets and the OT control systems 102a-102n associated with the SIL values. The SIL values may be associated with indicating RRF scores and RRF range that may be evaluated as an individual step to determine the priority levels of the SIL values.

At step 606, priority levels from the SIL values of the plurality of OT control systems 102a-102n may be determined in response to identifying the SIL value of the plurality of OT control systems 102a-102n.

At step 608, a critical OT control system 102a-102n along with the network packets of that critical control system 102*a*-102*n* may be determined which may be associated with a SIL value having a higher priority level. For example, a pressurized tank T3 includes a SIF in the form of a safety release valve with an associated pressure sensor and logic controller operating at SIL value 3. Another, less dangerous pressurized tank T2 may include a similar SIF operating at SIL value 2. Similarly, a pressurized tank T1 with SIL level 1 may be operating in the same SIS environment. Each of these tanks has a different SIL level based on their safety risk, and network communication associated with the SIF for each needs to take that into account.

Figure 6B:
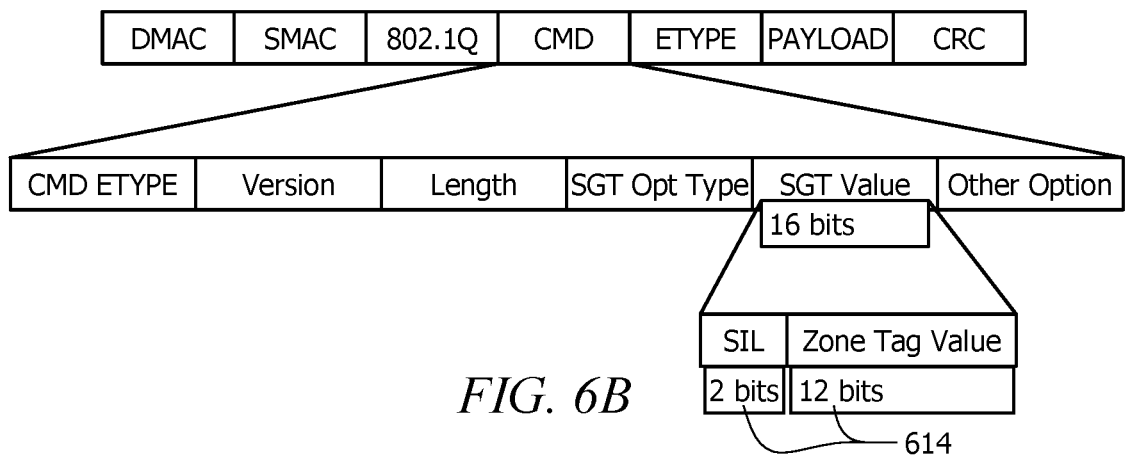
FIG. 6b depicts network frames of an OT control system, according to an embodiment.

At step 610, the network interface 108 after indicated with the priority levels, prioritizes the critical OT control system 102*a*-102*n* by encoding the network packets of the critical OT control system 102*a*-102*n* with corresponding SIL value. In an embodiment, a particular network group may be determined for the critical OT control system 102*a*-102*n* for classifying the critical OT control system 102*a*-102*n* into that particular network group along with a network tag to perform safety operations. Each of the plurality of network segments may be associated with network tags. A particular network tag comprising SGT may be assigned to the critical OT control system 102*a*-102*n*. Referring to FIG. 6*b*, the SIL value and the SGT tag denoted by numeral 614, may be encoded in the network packets associated with the critical OT control system 102*a*-102*n* to cause performing the safety operations of the critical OT control system 102*a*-102*n* by the computing systems 112 associated with the network group corresponding to the network tag. In one example, the SGT tag or SGT name space may be split to include the SIL value in the SGT frame as shown in the FIG. 6*b*. When the access switch learns about the SIL value associated with a particular device or port, the access switch marks all traffic for that device with the corresponding SIL value. After marking the traffic of the critical OT control system 102*a*-102*n*, the SIL value may be encoded into the ethernet frames as a tag which may be used for prioritization of the network traffic to mitigate safety events. The OT control systems 102*a*-102*n* may be classified into different segments by assigning network tags and hence creating zones with assets to satisfy the underlying reliability requirements of RRF and PFD scores/ranges a. In an embodiment, if there are devices within the same zone which require a differentiated treatment based on the SIL value then the upper two bits of the SGT may be used to convey the SIL value. The SGT may be assigned by the policy definition engine such as ISE along with the zone ID which may use the lower bits. In some embodiments, the computing systems 112 may initiate safety operations, for example, determining and delivering safety requirements, safety critical communications, emergency shutdown based on determining safety criticality of network packets to and from the plurality of OT control system 102*a*-102*n*; and performing interlock of the plurality of OT control systems 102*a*-102*n* and the critical OT control system 102*a*-102*n*. Based on the SIL value, the associated safety operation in the underlying network infrastructure may be implemented. In an embodiment, the SIL values provide an indication of the RRF required for a given SIF. In the case of network communication, the SIL value may be utilized to provide to determine how a given packet should be handled. A SIL value of 1 implies an RRF between 10 and 100. Thus, if a packet is received with a SIL value of 1, the process may determine that the likelihood of that packet being lost or corrupted to be somewhere between 10 and 100 times smaller than if the packet did not include any SIL value. Similarly, a SIL value of 2 implies a drop or corruption likelihood between 100 and 1,000 times smaller, whereas SIL value 3 requires between 1,000 and 10,000 times smaller and SIL value 4 requires between 10,000 and 100,000 times smaller. When the router or switch processes and forwards the packet, it must do so in a way that adheres to these RRF scores. In an embodiment, the network interface 108 may determine one or more factors to handle the network packets of the critical OT control system 102*a*-102*n*. The factors may include, but are not limited to, prioritizing queuing of the network packets of each of the plurality of OT control systems 102*a*-102*n*, calculating priorities for dropping the network packets to the computing systems 112 to perform the safety operations, determining traffic throttling on interface, selecting interface among multiple interfaces for forwarding the network packets, determining forward error correction, duplicating the network packets on one or more interface, and evaluating RRF scores for each of the plurality of OT control systems 102*a*-102*n* to determine number of interfaces needed to receive and drop the network packets to perform the safety operations by the computing systems 112.

Figure 7:
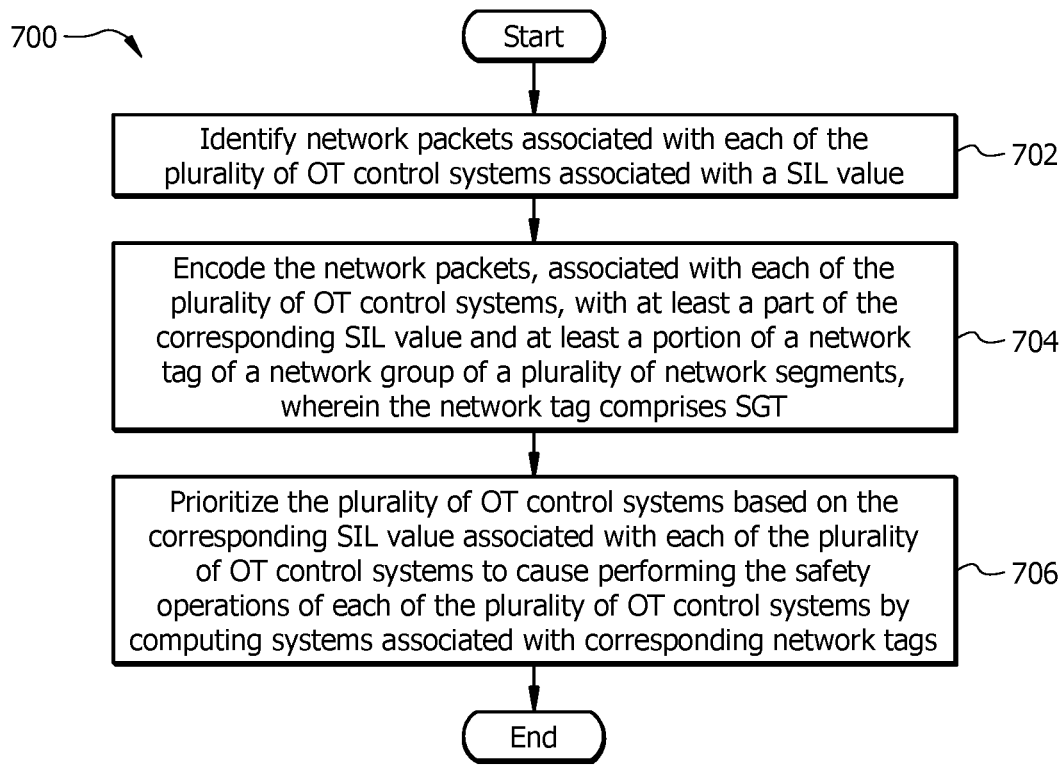
FIG. 7 depicts an example flowchart for prioritization of OT control systems based on SIL values, according to an embodiment.

FIG. 7 depicts an example flowchart for the prioritization of OT control systems 102*a*-102*n* based on SIL values, according to an embodiment.

The process 700 begins at step 702, for identifying network packets associated with each of the plurality of OT control systems 102*a*-102*n* associated with a SIL value. After configuration and/or installation of the OT control systems 102*a*-102*n*, each of the plurality of OT control systems may be configured with the corresponding SIL value and the SIL value of each of the plurality of OT control systems 102*a*-102*n* may be stored in memory associated with the network control system 110 to identify priority levels from the SIL value for each OT control system 102*a*-102*n*.

At step 704, the network packets associated with each of the plurality of OT control systems may be encoded with at least a part of the corresponding SIL value and at least a portion of the network tag comprising a portion of the SGT corresponding to the network group of the plurality of network segments At step 706, the plurality of OT control systems may be prioritized, to cause performing the safety operations of each of the plurality of OT control systems by computing systems 112 associated with the corresponding network tags, based on the corresponding SIL value associated with each of the plurality of OT control systems 102*a*-102*n*. In an embodiment, the process 700 may perform all the functions and operations of process 600 to prioritize the plurality of OT control systems 102*a*-102*n* based on their SIL values.

Figure 8:
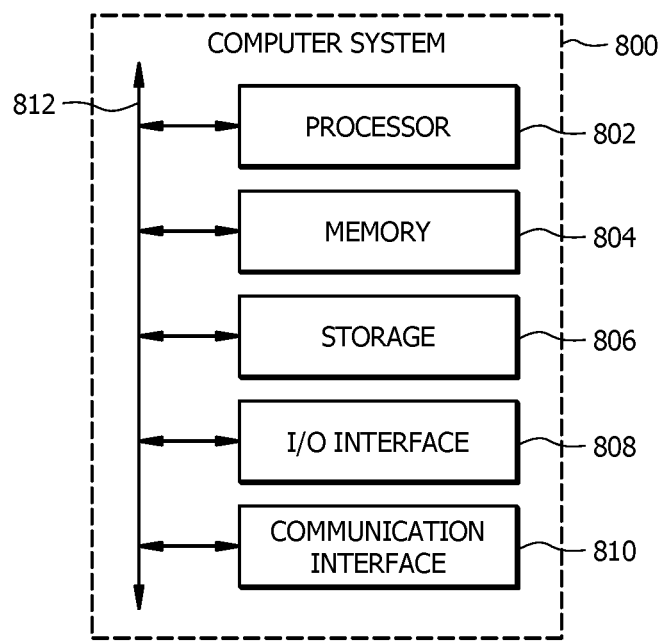
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide the functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memory 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes ROM. Where appropriate, this ROM may be mask-programmed ROM, PROM, EPROM, EEPROM, EAROM, or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The embodiments disclosed herein are only examples, and the scope of this disclosure is not limited to them. Particular embodiments may include all, some, or none of the components, elements, features, functions, operations, or steps of the embodiments disclosed herein. Embodiments according to the present disclosure are in particular disclosed in the attached claims directed to a method, a storage medium, a system, and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method of prioritizing operational technology (OT) control systems performed by a network control system, the method comprising:
- receiving, by a network interface communicatively coupled to the OT control systems in a safety instrumented system (SIS) environment, a plurality of network packets associated with the OT control systems;
- identifying, from the plurality of network packets, a plurality of OT control systems associated with safety integrity level (SIL) values;
- in response to identifying the plurality of OT control systems associated with the SIL values, determining priority levels from the SIL values of the plurality of OT control systems;
- identifying network packets associated with a critical OT control system, among the plurality of OT control systems, that is associated with a SIL value having a higher priority level; and
- prioritizing the critical OT control system comprising:
  - encoding the network packets, associated with the critical OT control system, with corresponding SIL value, wherein the critical OT control system is prioritized based on the corresponding SIL value and classified into a network group associated with a network tag to perform safety operations.

2. The method of claim 1, further comprising:
- identifying network packets associated with each of the plurality of OT control systems associated with a SIL value;
- encoding the network packets, associated with each of the plurality of OT control systems, with at least a part of the corresponding SIL value and at least a portion of a network tag of a network group of a plurality of network segments, wherein the network tag comprises SGT; and
- prioritizing the plurality of OT control systems based on the corresponding SIL value associated with each of the plurality of OT control systems.

3. The method of claim 2, further comprising determining one or more factors to prioritize the plurality of OT control systems comprising:
- prioritizing queuing of the network packets of each of the plurality of OT control systems, calculating priorities for dropping the network packets to the computing systems to perform the safety operations,
- determining traffic throttling on interfaces,
- selecting interfaces among multiple interfaces for forwarding the network packets, determining forward error correction,
- duplicating the network packets on one or more interfaces, and
- evaluating RRF scores for each of the plurality of OT control systems to determine number of interfaces needed to receive and drop the network packets to perform the safety operations by the computing systems.

4. The method of claim 3, wherein the safety operations comprise determining and delivering safety requirements, safety critical communications, and emergency shutdown based on determining safety criticality of network packets to and from the plurality of OT control systems.

5. The method of claim 1, further comprising authenticating each OT control system to identify the plurality of OT control systems associated with the SIL values.

6. The method of claim 1, further comprising:
- determining, among a plurality of network segments, the network group for the critical OT control system, wherein each of the plurality of network segments is associated with network tags;
- in response to determining the network group, assigning a network tag comprising a security group tag (SGT) to the critical OT control system; and
- encoding at least a part of the corresponding SIL value of the critical OT control system with at least a portion of the SGT of the network tag in the network packets associated with the critical OT control system to cause performing the safety operations of the critical OT control system by a computing system associated with the network group corresponding to the network tag.

7. The method of claim 1, wherein the SIL value is associated with indicating risk reduction factor (RRF) scores and RRF range.

8. The method of claim 1, further comprising:
- associating each of the plurality of OT control systems with the corresponding SIL value; and
- storing the SIL value of each of the plurality of OT control systems in memory associated with the network control system to identify priority levels from the SIL value for each OT control system.

9. A system, comprising:
- a safety instrumented system (SIS) environment comprising operational technology (OT) control systems associated with safety integrity level (SIL) values;
- a network control system to store the SIL values of the OT control systems and network tags of a plurality of network segments, each network tag comprising a security group tag (SGT);
- one or more network interfaces for receiving and delivering network packets associated with the OT control systems;
- computing systems to perform safety operations for the OT control systems;
- one or more processors; and
- one or more computer-readable non-transitory storage media in communication with the one or more processors and comprising instructions, that when executed by the one or more processors, are configured to cause the system to:
  - receive, by a network interface communicatively coupled to the OT control systems, a plurality of network packets associated with the OT control systems;
  - identify, from the plurality of network packets, a plurality of OT control systems associated with the SIL values;
  - in response to identifying the plurality of OT control systems associated with the SIL values, determine priority levels from the SIL values of the plurality of OT control systems;
  - identify the network packets associated with a critical OT control system, among the plurality of OT control systems, that is associated with a SIL value having a higher priority level; and prioritize the critical OT control system comprising:
encode the network packets, associated with the critical OT control system, with corresponding SIL value, wherein the critical OT control system is prioritized based on the corresponding SIL value and classified into a network group associated with a network tag to perform safety operations.

10. The system of claim 9, wherein the instructions, when executed by the one or more processors, are further configured to cause the system to:
identify network packets associated with each of the plurality of OT control systems associated with a SIL value;
encode the network packets, associated with each of the plurality of OT control systems, with at least a part of the corresponding SIL value and at least a portion of a network tag of a network group of a plurality of network segments, wherein the network tag comprises SGT; and
prioritize the plurality of OT control systems based on the corresponding SIL value associated with each of the plurality of OT control systems.

11. The system of claim 10, wherein the instructions, when executed by the one or more processors, are further configured to cause the system to: determine one or more factors to prioritize the plurality of OT control systems comprising:
prioritize queuing of the network packets of each of the plurality of OT control systems,
calculate priorities for dropping the network packets to the computing systems to perform the safety operations,
determine traffic throttling on interfaces,
select interfaces among multiple interfaces for forwarding the network packets,
determine forward error correction,
duplicate the network packets on one or more interfaces, and
evaluate RRF scores for each of the plurality of OT control systems to determine number of interfaces needed to receive and drop the network packets to perform the safety operations by the computing systems.

12. The system of claim 11, wherein the safety operations comprise determine and deliver safety requirements, safety critical communications, and emergency shutdown based on determining safety criticality of network packets to and from the plurality of OT control systems.

13. The system of claim 9, wherein the instructions, when executed by the one or more processors, are further configured to cause the system to: authenticate each OT control system to identify the plurality of OT control systems associated with the SIL values.

14. The system of claim 9, wherein the instructions, when executed by the one or more processors, are further configured to cause the system to:
determine, among the plurality of network segments, the network group for the critical OT control system, wherein each of the plurality of network segments is associated with network tags;
in response to determining the network group, assign a network tag comprising the SGT to the critical OT control system; and
encode at least a part of the corresponding SIL value of the critical OT control system with at least a portion of the SGT of the network tag in the network packets associated with the critical OT control system to cause performing the safety operations of the critical OT control system by a computing system associated with the network group corresponding to the network tag.

15. The system of claim 9, wherein the SIL value is associated with indicating risk reduction factor (RRF) scores and RRF range.

16. The system of claim 9, wherein the instructions, when executed by the one or more processors, are further configured to cause the system to:
configure and associate each of the plurality of OT control systems with the corresponding SIL value; and
store the SIL value of each of the plurality of OT control systems in memory associated with the network control system to identify priority levels from the SIL value for each OT control system.

17. One or more computer-readable non-transitory storage media including instructions that, when executed by one or more processors of a computer system comprising operational technology (OT) control systems associated with safety integrity level (SIL) values in a safety instrumented system (SIS) environment operatively coupled to a network control system and one or more network interfaces, are configured to cause the one or more processors to:
receive, by a network interface communicatively coupled to the OT control systems, a plurality of network packets associated with the OT control systems;
identify, from the plurality of network packets, a plurality of OT control systems associated with the SIL values;
in response to identifying the plurality of OT control systems associated with the SIL values, determine priority levels from the SIL values of the plurality of OT control systems;
identify the network packets associated with a critical OT control system, among the plurality of OT control systems, that is associated with a SIL value having a higher priority level; and
prioritize the critical OT control system comprising:
encode the network packets, associated with the critical OT control system, with corresponding SIL value, wherein the critical OT control system is prioritized based on the corresponding SIL value and classified into a network group associated with a network tag to perform safety operations.

18. The computer-readable non-transitory storage media of claim 17, wherein the instructions, when executed by the one or more processors of the computer system, are further configured to:
identify network packets associated with each of the plurality of OT control systems associated with a SIL value;
encode the network packets, associated with each of the plurality of OT control systems, with at least a part of the corresponding SIL value and at least a portion of a network tag of a network group of a plurality of network segments, wherein the network tag comprises SGT; and
prioritize the plurality of OT control systems based on the corresponding SIL value associated with each of the plurality of OT control systems.

19. The computer-readable non-transitory storage media of claim 18, wherein the instructions, when executed by the one or more processors of the computer system, are further configured to:

determine one or more factors to prioritize the plurality of OT control systems comprising:
- prioritize queuing of the network packets of each of the plurality of OT control systems,
- calculate priorities for dropping the network packets to the computing systems to perform the safety operations,
- determine traffic throttling on interfaces,
- select interfaces among multiple interfaces for forwarding the network packets,
- determine forward error correction,
- duplicate the network packets on one or more interfaces, and
- evaluate RRF scores for each of the plurality of OT control systems to determine number of interfaces needed to receive and drop the network packets to perform the safety operations by the computing systems.

20. The computer-readable non-transitory storage media of claim 17, wherein the instructions, when executed by the one or more processors of the computer system, are further configured to:
- determine, among the plurality of network segments, the network group for the critical OT control system, wherein each of the plurality of network segments is associated with network tags;
- in response to determining the network group, assign a network tag comprising the SGT to the critical OT control system; and
- encode at least a part of the corresponding SIL value of the critical OT control system with at least a portion of the SGT of the network tag in the network packets associated with the critical OT control system to cause performing the safety operations of the critical OT control system by a computing system associated with the network group corresponding to the network tag.

* * * * *